United States Patent
Ao et al.

(10) Patent No.: US 7,096,135 B2
(45) Date of Patent: Aug. 22, 2006

(54) METHOD AND SYSTEM FOR CALCULATING THE TRANSIT TIME OF AN ULTRASONIC PULSE

(75) Inventors: Xiaolei S. Ao, Lexington, MA (US); Oleg A. Khrakovsky, Lynn, MA (US); Jeffrey D. Tilden, Norton, MA (US)

(73) Assignee: Panametrics, Inc., Waltham, MA (US)

( * ) Notice: Subject to any disclaimer, the term of this patent is extended or adjusted under 35 U.S.C. 154(b) by 0 days.

(21) Appl. No.: 10/799,802

(22) Filed: Mar. 12, 2004

(65) Prior Publication Data

US 2005/0209795 A1    Sep. 22, 2005

(51) Int. Cl.
*G06F 19/00* (2006.01)

(52) U.S. Cl. ..................... 702/79; 73/861.27

(58) Field of Classification Search ................ 702/79, 702/45, 48, 54, 190, 191; 767/13, 140; 73/1.16, 73/1.48, 861, 861.27
See application file for complete search history.

(56) References Cited

U.S. PATENT DOCUMENTS

| | | | |
|---|---|---|---|
| 4,308,754 A | | 1/1982 | Pedersen et al. |
| 4,480,485 A | | 11/1984 | Bradshaw et al. |
| 4,538,469 A | | 9/1985 | Lynnworth et al. |
| 4,787,252 A | | 11/1988 | Jacobson et al. |
| 5,001,936 A | * | 3/1991 | Baumoel .................. 73/861.18 |
| 5,131,278 A | * | 7/1992 | Baumoel .................. 73/861.18 |
| 5,440,937 A | * | 8/1995 | Lynnworth et al. ...... 73/861.29 |
| 6,047,602 A | * | 4/2000 | Lynnworth ................... 73/632 |
| 6,062,091 A | | 5/2000 | Baumoel |
| 6,279,379 B1 | | 8/2001 | Logue et al. |
| 6,516,286 B1 | * | 2/2003 | Aebischer et al. .......... 702/158 |
| 6,626,049 B1 | * | 9/2003 | Ao .......................... 73/861.29 |
| 6,876,128 B1 | * | 4/2005 | Nguyen ...................... 310/325 |
| 2003/0172743 A1 | * | 9/2003 | Ao et al. .................. 73/861.27 |
| 2004/0123666 A1 | * | 7/2004 | Ao et al. ....................... 73/644 |
| 2005/0006985 A1 | * | 1/2005 | Nguyen ...................... 310/326 |
| 2005/0028579 A1 | * | 2/2005 | Owen ........................ 73/24.06 |
| 2005/0139013 A1 | * | 6/2005 | Hashimoto et al. ...... 73/861.27 |

OTHER PUBLICATIONS

General Electric Company, *Transport® PT878 Portable Flowmeter* (2004) <http://www.gepower.com/prod_serv/products/flowmeter/en/pt878.htm> (GE Energy-Waltham, MA).

General Electric Company, *GC868 Clamp-On Flowmeter* (2004) <http://www.gepower.com/prod_serv/products/flowmeter/en/gc868.htm> (GE Energy-Waltham, MA).

* cited by examiner

*Primary Examiner*—Patrick J. Assouad
(74) *Attorney, Agent, or Firm*—Iandiorio & Teska

(57) ABSTRACT

An automated method and system for calculating the transit time of a pulsed signal transmitted from a first ultrasonic transducer to a second ultrasonic transducer is provided. The method includes measuring the amplitude of the pulsed signal received at the second transducer from the first transducer; measuring the amplitude of any noise proximate to the received pulsed signal; and calculating the signal to noise ratio of the received pulsed signal and the noise, respectively. If the signal to noise ratio is above a predetermined threshold, a first technique is automatically implemented for calculating the transit time of the received pulsed signal. If the signal to noise ratio is less than the predetermined threshold, a second different technique is automatically implemented for calculating the transit time of the received pulsed signal.

34 Claims, 7 Drawing Sheets

METHOD AND SYSTEM FOR CALCULATING THE TRANSIT TIME OF AN ULTRASONIC PULSE

FIELD OF THE INVENTION

This invention generally relates to an automated method and system for calculating the transit time of a transmitted pulse, and more specifically for calculating the transit time of an ultrasonic pulse transmitted through a fluid flow from a first ultrasonic transducer to a second transducer.

BACKGROUND OF THE INVENTION

Ultrasonic flow meter systems are known for measuring the rate of fluid (e.g., gas or liquid) flow within a conduit such as a pipe. In one particular system, two transducers are disposed on the exterior of the conduit at an oblique angle to each other and are commonly referred to as the upstream transducer and the downstream transducer. The rate of fluid flow through the conduit is determined by first transmitting a pulse from the upstream transducer to the downstream transducer. Next, the downstream transducer transmits a pulse to the upstream transducer. The transit time of the pulse transmitted from the upstream transducer to the downstream transducer is less than that of the pulse transmitted in the reverse direction and the fluid flow rate can be determined (calculated) based on the difference in the measured transit times of the two pulses. Those skilled in the art know that the transducers can be clamped on the exterior of the conduit or can be inserted through the wall of the conduit (e.g., "wetted transducers").

Ultrasonic systems may be used to measure the flow of many different types and densities of liquid or gas and may be used with different types of conduits in varying degrees of condition. These widely varying environments can create different signal to noise ratios when one of the transducers transmits to the other transducer. For example, if the fluid flow to be measured is liquid, the signal to noise ratio will generally be high. If the fluid flow to be measured is gas, the signal to noise ratio will generally be lower. Depending on the signal to noise ratio, different techniques are employed to measure the transit time and time differential between the up and down transit times. For example, if the signal to noise ratio is high, one high resolution technique for measuring the transit time is the cross correlation technique. See U.S. Pat. No. 4,787,252 incorporated herein by this reference. But, if the signal to noise ratio is low, the high resolution method cross correlation technique may result in errors when the transit time is calculated resulting in an inaccurate flow rate determination. Thus, those skilled in the art may employ a different technique for measuring the transit time. One example of a technique for measuring the transit time where the signal to noise ratio is low is the integrated threshold technique disclosed in U.S. Pat. No. 4,538,469 also incorporated herein by this reference. Although the integrated threshold technique doesn't provide as high resolution as the cross correlation technique, it is more robust.

Moreover, the signal to noise ratio of any particular transducer arrangement may change over time if the conduit deteriorates, for example, the signal to noise ratio may decrease. Thus, an ultrasonic flow meter system controller (electronics) may be configured at the time of installation to employ the cross correlation technique because the signal to noise ratio is high. But, later in time if the signal to noise ratio is reduced, the cross correlation technique will no longer provide an accurate flow rate determination.

In the prior art, it was often necessary to have a technician or engineer set up an ultrasonic flow meter after evaluating the flow measurement site by connecting an oscilloscope to the meter (or controller) to determine the signal to noise ratio before a particular technique for calculating the transit time of each transmitted pulse could be selected and the transit time measured. This practice is time consuming, expensive, and at times may not be accurate. Moreover, an oscilloscope is an expensive piece of equipment that takes expertise to operate.

BRIEF SUMMARY OF THE INVENTION

In one embodiment, the subject invention provides an automated method and system for calculating the transit time of a pulse from a first ultrasonic transducer to a second ultrasonic transducer more accurately. The method and system of this invention accurately determines the transit time of a pulse to and from transducers even if the signal to noise ratio changes over time. An oscilloscope and an engineer or technician is not required to determine the signal to noise ratio thus saving time and expense.

In at least one embodiment, the subject invention results from the realization that an automated and easy to use more accurate method for calculating the transit time of a pulse transmitted through fluid flow from a first ultrasonic transducer to a second ultrasonic transducer is achieved by automatically calculating the signal to noise ratio of the received pulse and then automatically selecting the appropriate technique for calculating the transit time of the received pulse based upon the level of the signal to noise ratio.

In one embodiment, this invention features an automated method for calculating the transit time of a pulsed signal transmitted from a first ultrasonic transducer to a second ultrasonic transducer. The method comprises measuring the amplitude of the pulsed signal received at the second transducer from the first transducer; measuring the amplitude of any noise proximate to the pulsed signal; and calculating the signal to noise ratio of the pulsed signal and the noise, respectively. If the signal to noise ratio is above a predetermined threshold, a first technique for calculating the transit time of the received pulsed signal is implemented. But, if the signal to noise ratio is less than the predetermined threshold, a second different technique for calculating the transit time of the received pulsed signal is implemented.

In one example, the first technique may include a cross correlation technique and the second technique is an integrated threshold technique. The predetermined threshold may be approximately between 7 and 13. The first transducer and the second transducer may be on the same side of a conduit or the first transducer and the second transducer may be on opposite sides of a conduit. The first transducer and the second transducer may be clamped on a conduit. The first transducer and the second transducer may be disposed in a conduit in a wetted configuration. The method may further include the step of adjusting preselected characteristics of the transmitted pulsed signal based upon the calculated signal to noise ratio. The method may further include the step of outputting an error message if the signal to noise ratio is below a second predetermined threshold. The second predetermined threshold may be between 0.25 and 1.0.

The step of measuring the amplitude of the pulsed signal may include measuring the maximum amplitude of the received pulsed signal. The step of measuring the amplitude of the noise may include measuring the maximum amplitude of the noise in a predetermined window of time. The step of measuring the amplitude of the noise may include windowing noise data. The window may directly precede the received pulsed signal. The amplitude of the pulsed signal may be measured before the amplitude of the noise is measured.

This invention also features a system for calculating the transit time of a pulsed signal transmitted through a conduit, the system comprising: a first transducer which can be coupled to the conduit; at least second transducer which can be coupled to the conduit; a controller coupled to the first transducer and the second transducer. The controller is configured to measure the amplitude of the received pulsed signal received at the second transducer from the first transducer, measure the amplitude of noise proximate to the received pulsed signal, calculate the signal to noise ratio of the received pulsed signal and the noise, respectively, implement a first technique for calculating the transit time of the received pulsed signal if the signal to noise ratio is above a predetermined threshold, and implement a second, different technique for calculating the transit time of the received pulsed signal if the signal to noise ratio is less than the predetermined threshold.

In one example, the first technique is the cross correlation technique and the second technique is the integrated threshold technique. The predetermined threshold may be approximately between 7 and 13. The first transducer and the second transducer may be on the same side of the conduit. The first transducer and the second transducer may be on opposite sides of the conduit. The first transducer and the second transducer may be clamped on the conduit or the first transducer and the second transducer may be disposed in the conduit in a wetted configuration. The controller may be configured to adjust the configuration of the pulsed signal based upon the calculated signal to noise ratio. The controller may also be configured to output an error message if the signal to noise ratio is below a second predetermined threshold such as between 0.25 and 1.0. The controller may be further configured to measure the maximum amplitude of the pulsed signal. The controller may be further configured to measure the maximum amplitude of the signal noise in a predetermined window of time. The step of measuring the amplitude of the noise may include windowing noise data. The window may directly precede the pulsed signal. The amplitude of the pulsed signal may be measured before the amplitude of the noise is measured. The controller may include a transmitter, a receiver, a processor which accesses a memory and the memory includes computer code which measures the amplitude of the pulsed signal received at the second transducer from the first transducer, the amplitude of noise proximate to the pulsed signal, and calculates the signal to noise ratio of the pulsed signal and the noise, respectively.

This invention also features a computer program for calculating the transit time of a pulsed signal through a conduit from a first ultrasonic transducer to a second ultrasonic transducer. The program comprises instructions for measuring the amplitude of the pulsed signal received at the second transducer from the first transducer, measuring the amplitude of noise proximate to the pulsed signal, calculating the signal to noise ratio of the pulsed signal and the noise, respectively, implementing a first technique for calculating the transit time of the received pulsed signal if the signal to noise ratio is above a predetermined threshold, and implementing a second, different technique for calculating the transit time of the received pulsed signal if the signal to noise ratio is less than the predetermined threshold.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1A:
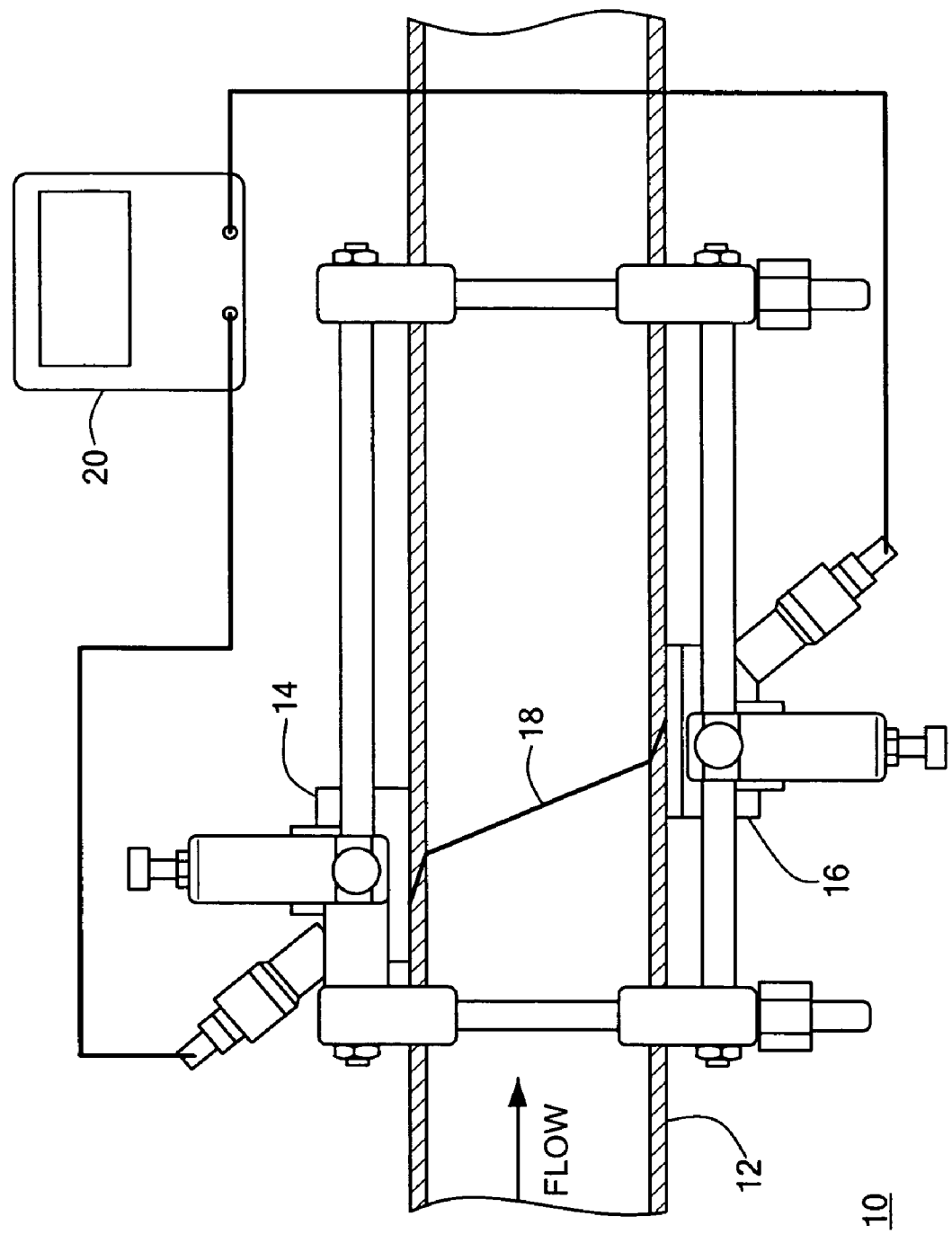
FIGS. 1A, 1B, and 1C are schematic diagrams of typical ultrasonic systems for determining the rate of fluid flow through a conduit.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Ultrasonic flow meter 10, FIG. 1A, measures the rate of fluid flow within conduit 12. Two transducers 14 and 16 are disposed on the exterior of conduit 12. Transducers 14 and 16 are shown as being on the opposite sides of conduit 12, but may be disposed on the same side of the conduit. Clamp on transducers as shown but they may also be wetted transducers. As described above, the rate of fluid flow through conduit 12 is determined by first transmitting an ultrasonic pulse from transducer 14, also known as the upstream transducer, to transducer 16, also known as the downstream transducer. Next, transducer 16 will transmit a signal to transducer 14. Since the transit time of the pulse transmitted from transducer 14 will be faster than the pulse transmitted from transducer 16, the rate of fluid flow through conduit 12 can be determined by subtracting the transit time of the pulse transmitted from transducer 16 from the pulse transmitted from transducer 14. The timing and measurement of pulses from transducers 14 and 16 are controlled by controller 20. The transmitted pulse or pulsed signal may be a square or sinusoidal wave, a pulse train, a coded pulse or any type of varying signal.

Figure 1B:
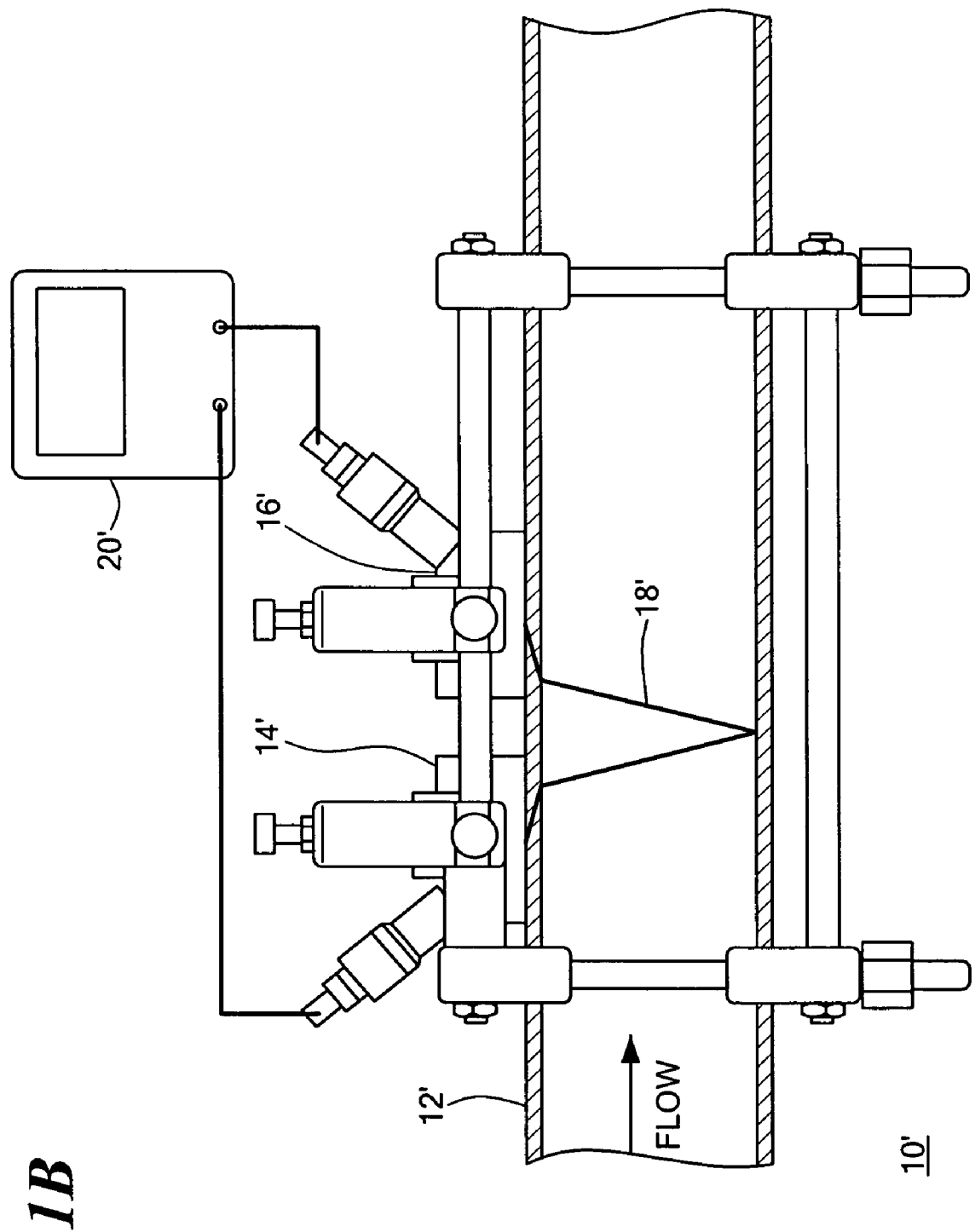
Figure 1C:
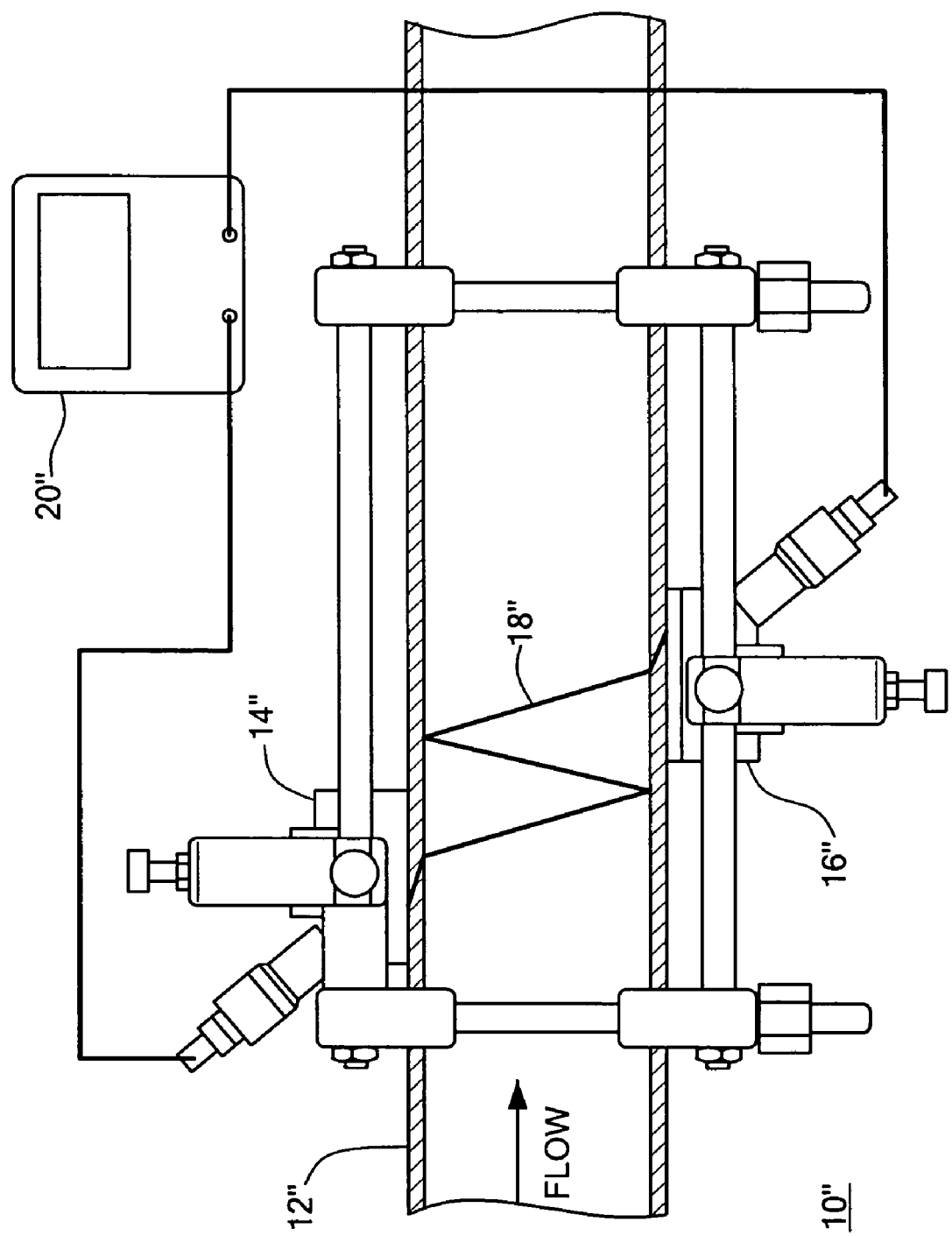

Transducers 14 and 16 each transmit a pulse 18 that traverses conduit 12 once whereas in another example transducers 14' and 16' of flowmeter 10', FIG. 1B, are located on the same side of conduit 12' and are each configured to transmit a pulse 18' that reflects off the inner surface of conduit 12' once before being received by the other transducer. The controller 20' sends a pulse to transducer 14' or 16' and the other of the transducers receives the pulse. Controller 20' measures the signal arrival time of pulse 18'. Transducers 14" and 16" and controller 20" of flowmeter 10", FIG. 1C may also be configured to transmit and reflect pulse 18" twice off the inner surface of conduit 12", in which case transducers 14" and 16" are located on opposite sides of conduit 12".

Although transducers 14, 16, 14' and 16' are shown as being clamped to conduit 12, these transducers could also be disposed on conduit 12 in a wetted configuration. In a wetted configuration, transducers 14 and 16 would be in direct contact with the fluid flowing in conduit 12.

Figure 2A:
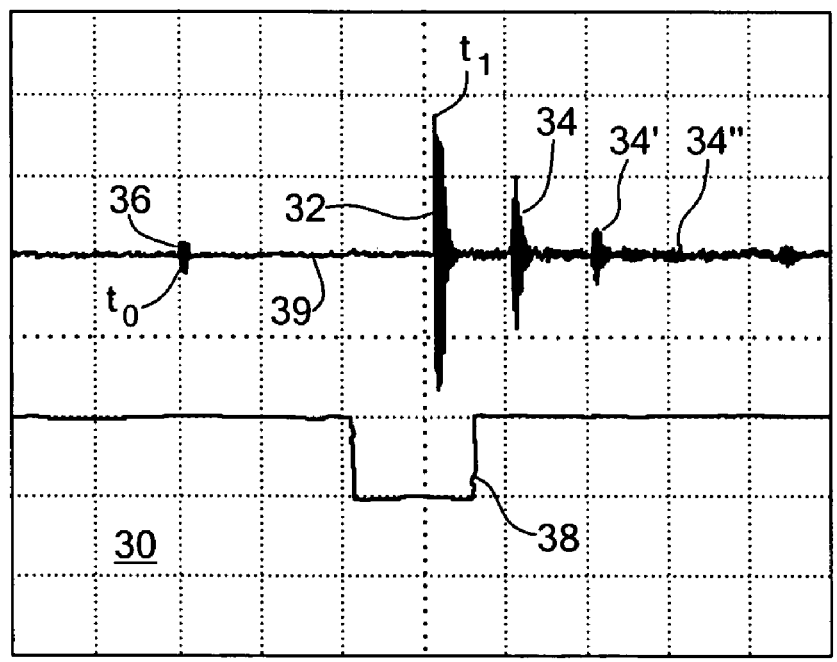
FIGS. 2A and 2B are graphs of voltage versus time for a low noise ultrasonic signal transmitted from a first transducer through liquid and received at a second transducer.
Figure 2B:
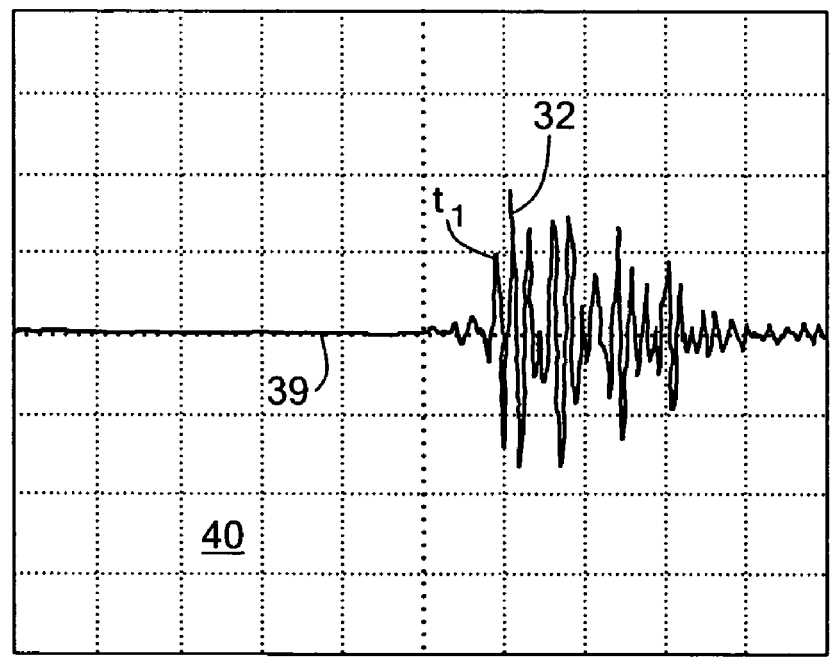

Graph 30, FIG. 2A, shows the voltage level of a pulse 32 received at one of the transducers 14 or 16. A pulse transmitted from one of the transducers 14 or 16 at time to is received at the other of the transducers at time $t_1$. Thus, the transit time of this pulse is measured between $t_0$ and $t_1$. Echoes 34, 34', and 34" of pulse 32 are received at the receiving transducer after pulse 32 has been received. Signal 36 is cross-talk between the two transducers through the pipe wall and is not valuable information. As can be seen, the level of noise 39 is relatively low to pulse 32, as is the general case when the flow to be measured is liquid. Time window 38 includes pulse 32 within its range is rendered at a higher resolution in 40, FIG. 2B, which also shows that the signal to noise ratio of pulse 32 to noise 39 is relatively high.

Figure 3:
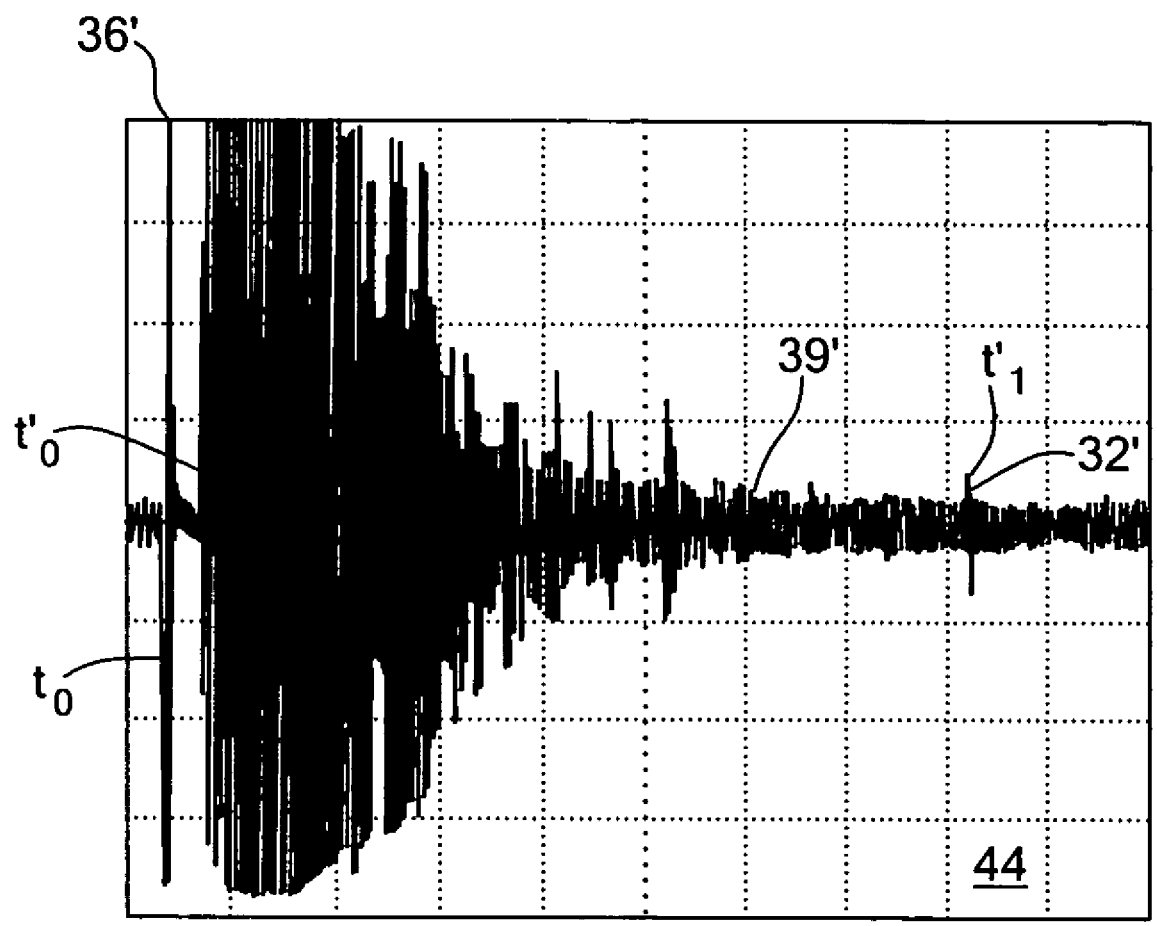
FIG. 3 is a graph of voltage versus time for a high noise ultrasonic signal transmitted from a first transducer through gas and received at a second transducer.

Graph 44, FIG. 3, shows the high level of noise 39' in relation to the received pulse 32' at time $t_1'$ for a pulse transmitted at time $t_0$ through a gas. The level of cross-talk 36' at $t_0'$ is also shown as being very high. It is possible that for some gases, the level of the received pulse 32' could be even lower than the level of noise 39', in which case sophisticated signal processing techniques would be required to determine the level and location of received pulse 32'.

Figure 4:
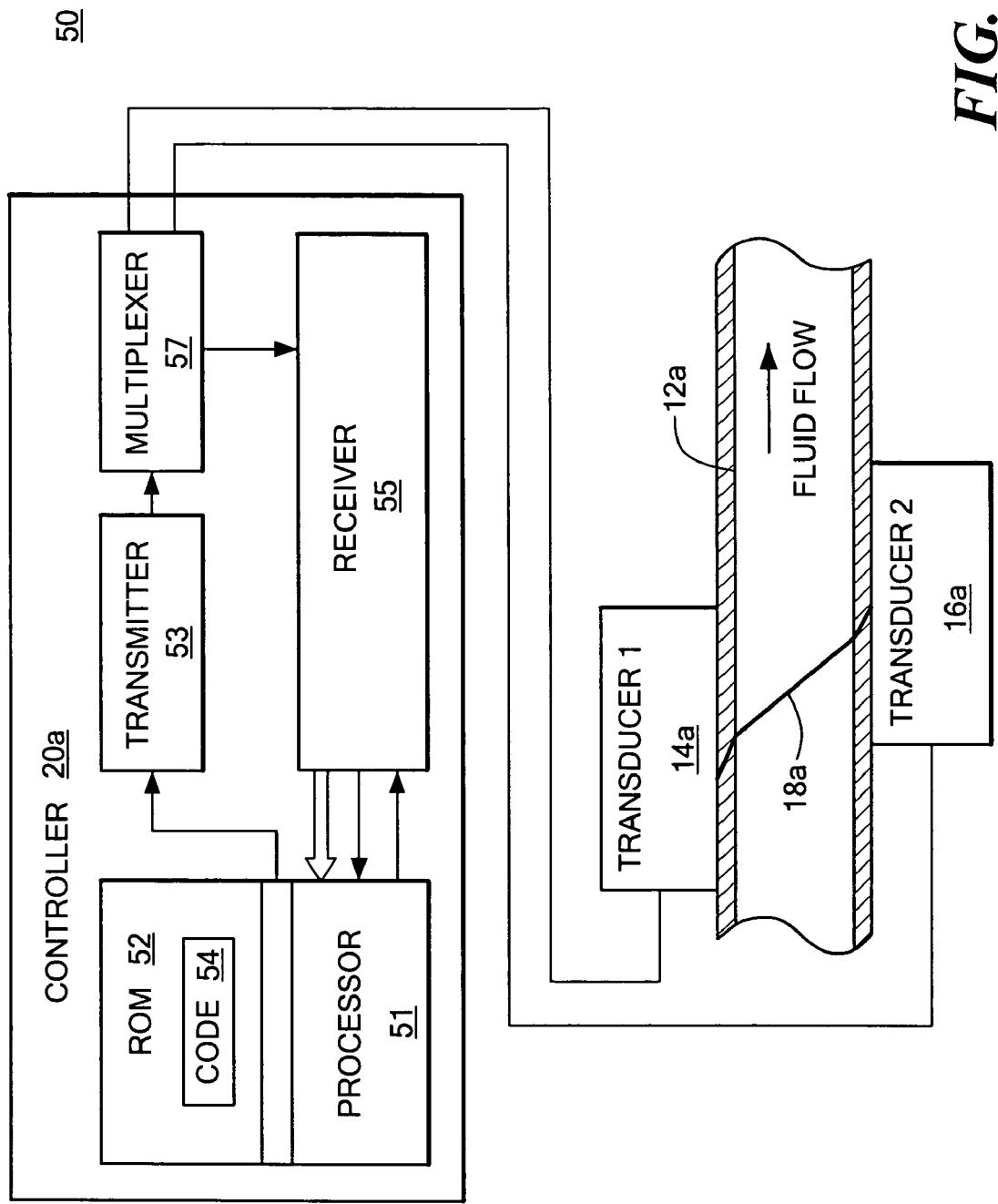
FIG. 4 is a block diagram showing the primary components associated with one example of the system for calculating the transit time of a pulse from a first ultrasonic transducer to a second ultrasonic transducer in accordance with one embodiment of the subject invention.

In accordance with one embodiment of the subject invention, system 50, FIG. 4, includes controller 20a that includes processor 51 and a memory 52. Processor 51 of controller 20a is coupled to both transducers 14a and 16a which are each coupled to conduit 12a. Memory 52 may be an erasable programmable memory (EPROM) and have programmable code 54 stored therein. Together, processor 51 and memory 52 are configured to measure the amplitude of a received pulse at one of the transducers, measure the amplitude of any noise proximate the pulse, and calculate the signal to noise ratio of the pulse in relation to the noise. Processor 51 controls transmitter 53 to transmit an electrical signal through multiplexer 57 to transducer 14a or 16a, which transmits a pulse to the other of the transducers. When one of transducers 14a or 16a receives a pulse, it transmits a signal through multiplexer 57 to receiver 55, which transmits to processor 51 a digitized signal that corresponds to the received pulse.

Controller 20a will then automatically implement one technique such as the cross correlation technique (also stored in memory 52) for calculating the transit time of the received pulse when the calculated signal to noise ratio is above a predetermined threshold. If the signal to noise ratio is less than the predetermined threshold, however, controller 20a will implement a second different technique for calculating the transit time of the received pulse. One such technique is the integrated threshold technique.

In this manner, controller 20a will select the appropriate method for calculating the transit time based upon the signal to noise ratio. Having controller 20a select an appropriate technique based upon the signal to noise ratio prevents controller 20a from making an erroneous measurement if the signal to noise ratio is far lower than expected, which can happen if an unexpected fluid is present in conduit 12 or if the conduit has suffered deterioration due to usage or age, or if any other condition renders the signal to noise ratio level too low for accurate use of the cross correlation technique.

The threshold of the signal to noise ratio may be approximately 10 or may be selected between the range of 7 and 13. Above this threshold, controller 20a may choose to implement the method of cross correlation to calculate the transit time of the received pulse. If the signal to noise ratio is measured as being low, such as below 10, controller 20a may decide to implement an integrated threshold method to calculate the transit time of the received pulse. Additionally, controller 20a may use a second predetermined threshold such as 0.5 or a number between 0.25 and 1.0 below which controller 20a will not calculate the transit time because the signal to noise ratio is too low to obtain an accurate flow rate calculation. Below the second threshold, controller 20a may output an error message to the user that the signal to noise ratio is too low to determine the rate of fluid flow. Thus, the transit time of an ultrasonic pulse (downstream and upstream) is more accurately measured based upon the signal to noise ratio.

Controller 20a may change the characteristics of the pulse based upon the measured signal to noise ration. For example, controller 20a may change the shape, duration, and/or the type, e.g., sinusoidal or square wave, of the pulse based upon the measured signal to noise ratio.

Although FIG. 4 shows transducers 14a and 16a as being disposed on opposite sides of conduit 12a, this is not a limitation of the invention. Transducer 14a and transducer 16a could be disposed on the same side of conduit 12a in which a transmitted pulse 18a would reflect once off the inside of conduit 12a. Also, although transducers 14a and 16a are shown as being clamped onto conduit 12a, transducers 14a and 16a could be disposed in conduit 12a in a wetted configuration.

Figure 5:
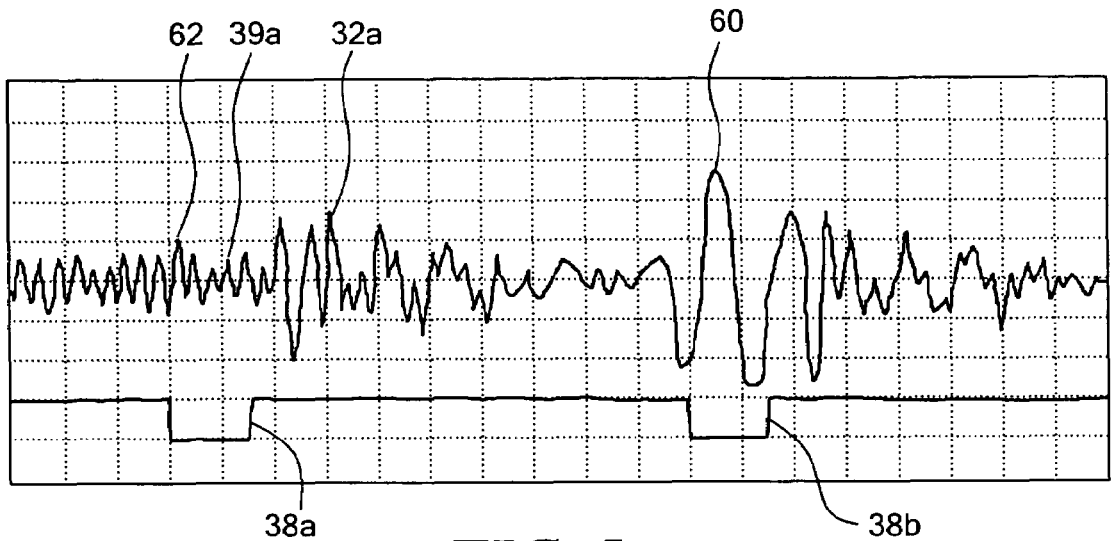
FIG. 5 is a graph of voltage versus time for a pulse transmitted through gas and received at a transducer using the system of FIG. 4.

To measure the noise 39a, FIG. 5, proximate a received pulse, a window 38a is used to evaluate the noise within a predetermined time range. Window 38a is placed before the received pulse 32a to obtain optimal results. The location of data window 38a may be determined after the coarse location of the pulse 32a is obtained. The type of conduit 12a, the fluid flowing through conduit 12a, and coarse sound speed of the fluid are typically known to the user. The coarse sound speed of the fluid can be obtained from a look up table or pre-built into a flowmeter. Likewise, window 38b can be used to determine the amplitude of the received pulse 32a. Although other methods could be used to determine the amplitude of noise and a received pulse, the signal to noise ratio may be determined by using the maximum amplitude 60 of the pulse received within window 38b divided by the maximum amplitude 62 of the noise received within window 38a.

Figure 6:
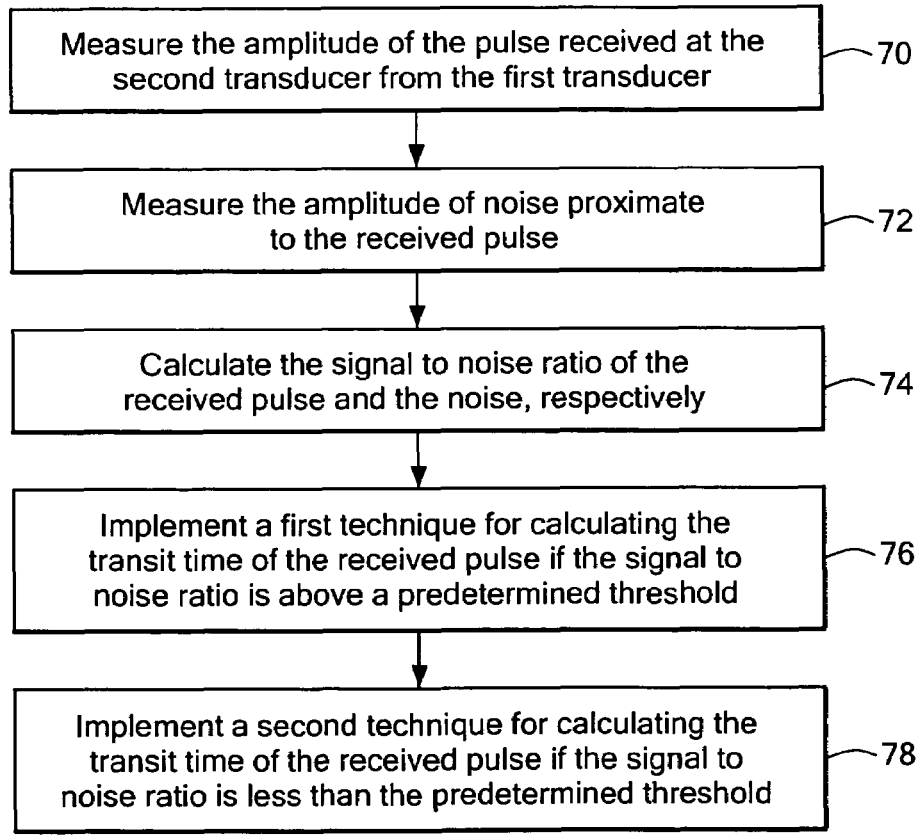
FIG. 6 is a flow chart showing the primary steps associated with one example of the method of calculating the transit time of a pulse from a first ultrasonic transducer to a second ultrasonic transducer in accordance with an embodiment of the subject invention and also showing the programming associated with the memory of the system of FIG. 4.

The method in accordance with one embodiment of the invention for calculating the transit time of a pulse transmitted from a first ultrasonic transducer to a second ultrasonic transducer, FIG. 6, begins at step 70 with measuring the amplitude of the pulse received at the second transducer from the first transducer. At step 72, the amplitude of any noise proximate to the received pulse is measured. Data windows may be used to make these measurements at steps 70 and 72. At step 74, the signal to noise ratio of the received pulse and the noise are calculated. The maximum value of the noise and the maximum value of the pulse within their respective windows can be used for this calculation. At step 76, the first technique, such as, for example, cross correlation, is implemented for calculating the transit time of the received pulse if the signal to noise ratio is above a predetermined threshold. At step 78, a second technique, such as, for example, the integrated threshold technique, is implemented for calculating the transit time of the received pulse if the signal to noise ratio is less than the predetermined threshold. Controller 20*a* may perform the steps of this method or this method may be embodied in software or computer code and may be placed in memory 52 within controller 20*a*. The code for implementing this method may be provided on an EPROM chip and provided as an upgrade to ultrasonic flowmeters GC868 or PT878GC manufactured by GE Panametrics located in Waltham, Mass., the assignee hereto.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, other techniques for calculating the transit time of a pulse suitable for different signal to noise ratios known to those skilled in the art may be used.

Other embodiments will occur to those skilled in the art and are within the following claims:

What is claimed is:

1. An automated method for calculating the transit time of a pulsed signal transmitted from a first ultrasonic transducer to a second ultrasonic transducer, the method comprising:
   measuring the amplitude of the pulsed signal received at the second transducer from the first transducer;
   measuring the amplitude of any noise proximate to the received pulsed signal;
   calculating the signal to noise ratio of the received pulsed signal and the noise, respectively;
   if the signal to noise ratio is above a predetermined threshold, automatically implementing a first technique for calculating the transit time of the received pulsed signal; and
   if the signal to noise ratio is less than the predetermined threshold, automatically implementing a second different technique for calculating the transit time of the received pulsed signal.

2. The method of claim 1 in which the first technique includes a cross correlation technique.

3. The method of claim 1 in which the second technique includes an integrated threshold technique.

4. The method of claim 1 in which the predetermined threshold is approximately between 7 and 13.

5. The method of claim 1 in which the first transducer and the second transducer are on the same side of a conduit.

6. The method of claim 1 in which the first transducer and the second transducer are on opposite sides of a conduit.

7. The method of claim 1 in which the first transducer and the second transducer are clamped on a conduit.

8. The method of claim 1 in which the first transducer and the second transducer are disposed in a conduit in a wetted configuration.

9. The method of claim 1 further comprising the step of adjusting preselected characteristics of the transmitted pulsed signal based upon the calculated signal to noise ratio.

10. The method of claim 1 further including the step of outputting an error message if the signal to noise ratio is below a second predetermined threshold.

11. The method of claim 10 in which the second predetermined threshold is between 0.25 and 1.0.

12. The method of claim 1 in which the step of measuring the amplitude of the pulsed signal includes measuring the maximum amplitude of the pulsed signal.

13. The method of claim 1 in which measuring the amplitude of the noise includes measuring the maximum amplitude of the noise in a predetermined window of time.

14. The method of claim 1 in which the step of measuring the amplitude of the noise includes windowing noise data.

15. The method of claim 14 in which the window directly precedes the pulsed signal.

16. The method of claim 1 in which the amplitude of the pulsed signal is measured before the amplitude of the noise is measured.

17. A system for calculating the transit time of a pulsed signal transmitted through a conduit, the system comprising:
   a first transducer which can be coupled to the conduit;
   at least second transducer which can be coupled to the conduit;
   a controller coupled to the first transducer and the second transducer configured to:
      measure the amplitude of the pulsed signal received at the second transducer from the first transducer,
      measure the amplitude of noise proximate to the received pulsed signal,
      calculate the signal to noise ratio of the received pulsed signal and the noise, respectively,
      implement a first technique for calculating the transit time of the received pulsed signal if the signal to noise ratio is above a predetermined threshold, and
      implement a second, different technique for calculating the transit time of the received pulsed signal if the signal to noise ratio is less than the predetermined threshold.

18. The system of claim 17 in which the first technique includes a cross correlation technique.

19. The system of claim 17 in which the second technique includes an integrated threshold technique.

20. The system of claim 17 in which the predetermined threshold is approximately between 7 and 13.

21. The system of claim 17 in which the first transducer and the second transducer are on the same side of the conduit.

22. The system of claim 17 in which the first transducer and the second transducer are on opposite sides of the conduit.

23. The system of claim 17 in which the first transducer and the second transducer are clamped on the conduit.

24. The system of claim 17 in which the first transducer and the second transducer are disposed in the conduit in a wetted configuration.

25. The system of claim 17 in which the controller is further configured to adjust the configuration of the pulsed signal based upon the calculated signal to noise ratio.

26. The system of claim 17 in which the controller is further configured to output an error message if the signal to noise ratio is below a second predetermined threshold.

27. The system of claim 26 in which the second predetermined threshold is between 0.25 and 1.0.

28. The system of claim 17 in which the controller is further configured to measure the maximum amplitude of the pulsed signal.

29. The system of claim 17 in which the controller is further configured to measure the maximum amplitude of the signal noise in a predetermined window of time.

30. The system of claim 17 in which the step of measuring the amplitude of the noise includes windowing noise data.

31. The system of claim 30 in which the window directly precedes the received pulsed signal.

32. The system of claim 17 in which the amplitude of the pulsed signal is measured before the amplitude of the noise is measured.

33. The system of claim 17 in which the controller includes a transmitter, a receiver, and a processor which accesses a memory and the memory includes computer code which measures the amplitude of the pulsed signal received at the second transducer from the first transducer, the amplitude of noise proximate to the pulsed signal, and calculates the signal to noise ratio of the pulsed signal and the noise, respectively.

34. A computer-readable medium encoded with a computer program for calculating the transit time of a pulsed signal through a conduit from a first ultrasonic transducer to a second ultrasonic transducer, the medium comprising:

the computer program including instructions for:

measuring the amplitude of the pulsed signal received at the second transducer from the first transducer, measuring the amplitude of noise proximate to the received pulsed signal, calculating the signal to noise ratio of the received pulsed signal and the noise, respectively, implementing a first technique for calculating the transit time of the received pulsed signal if the signal to noise ratio is above a predetermined threshold, and implementing a second, different technique for calculating the transit time of the received pulsed signal if the signal to noise ratio is less than the predetermined threshold.

* * * * *